INVENTORS
PRESTON L. GANT
KANG YANG

INVENTORS
PRESTON L. GANT
KANG YANG
BY
ATTORNEY

3,208,200
LOW TEMPERATURE ADSORPTION PROCESS FOR PURIFYING LOW MOLECULAR WEIGHT GASES
Preston L. Gant and Kang Yang, Ponca City, Okla., assignors to Continental Oil Company, Ponca City, Okla., a corporation of Delaware
Filed May 18, 1961, Ser. No. 110,993
6 Claims. (Cl. 55—68)

This invention relates to a process for purifying and separating gases of low molecular weight and small molecular size by selective adsorption at low temperatures upon molecular sieve material. In one of its more specific aspects, the invention relates to the purification of tritium gas by the removal of tritiated methane present as an impurity in such gas. In another of its aspects, the invention relates to the separation of methane from ethane and higher paraffin hydrocarbon homologues.

Commercially available tritium gas invariably contains tritiated methane as an impurity. It is highly desirable that this impurity be removed, since the impurity seriously interferes with the mechanism study of radiolysis reactions initiated by the $\beta$ decay of tritium. The presence of the impurity is also detrimental due to the formation of undesirable side products when the tritium is to be reacted with organic compounds for purposes of radioactive labeling and tracer studies. Previous attempts to purify hydrogen isotopes have often been very expensive, with the purity of the products generally being proportional to the expense of the technique used to obtain them. For example the method of diffusing hydrogen isotopes through thin layers of platinum or palladium is very expensive, time consuming, and involves the use of complicated apparatus. Moreover, the yields obtained by such methods are frequently quite low.

The present invention, in one of its aspects, comprises a rapid and highly effective method of purification of tritium, the hydrogen isotope of atomic weight 3, by the removal of tritiated methane present as an impurity. The invention is based upon the discovery that the separation of these gases may be accomplished by selectively adsorbing the tritiated methane upon an appropriate molecular sieve material at very low temperatures.

We have also utilized low temperature molecular sieve separation to effectively remove ethane from methane. It is believed that failure to fully appreciate the effect of temperature has thus far precluded successful segregation of these gases to permit each to be substantially improved in purity. Thus, the best quality of methane which is currently commercially available contains as much as 0.3 percent of other hydrocarbons, the greater portion of which is ethane. Although methane of this purity is sufficient for many purposes, it leaves much to be desired when used in radiochemistry techniques, since the impurities present seriously interfere with various investigations; for example, the mechanism elucidation of the radiolytic decomposition of methane.

The method of the present invention allows the ethane content of methane to be reduced below $10^{-4}$ mole percent. The method is well suited for the segregation of ethane from natural gas so that methane and ethane may be economically recovered in purified form for subsequent commercial usage. In the methane-ethane separation, like the tritium purification process referred to above, the segregation of the components is effected by low temperature, selective adsorption upon a suitable molecular sieve material.

It is an object of the present invention to provide a method for separating gases of low molecular weight and small molecular size.

A further object of the present invention is to provide a method of purifying tritium gas by the removal of tritiated methane therefrom.

An additional object of the present invention is to provide a method for purifying methane by the removal of ethane therefrom.

A further object of the present invention is to provide a method for quickly and efficiently purifying tritium gas, which method is simple and may be practiced using inexpensive equipment.

Another object of the present invention is to provide a method of segregating natural gas into its methane and ethane components so that each may be recovered in a substantially pure state for subsequent commercial usage.

Another object of the present invention is to provide a method for purifying methane by the removal of ethane and higher paraffin hydrocarbon homologues therefrom.

Other objects and advantages of the present invention will become apparent when the following disclosure is read in conjunction with the accompanying drawings which demonstrate the results obtainable through the use of the invention.

Figure 1:
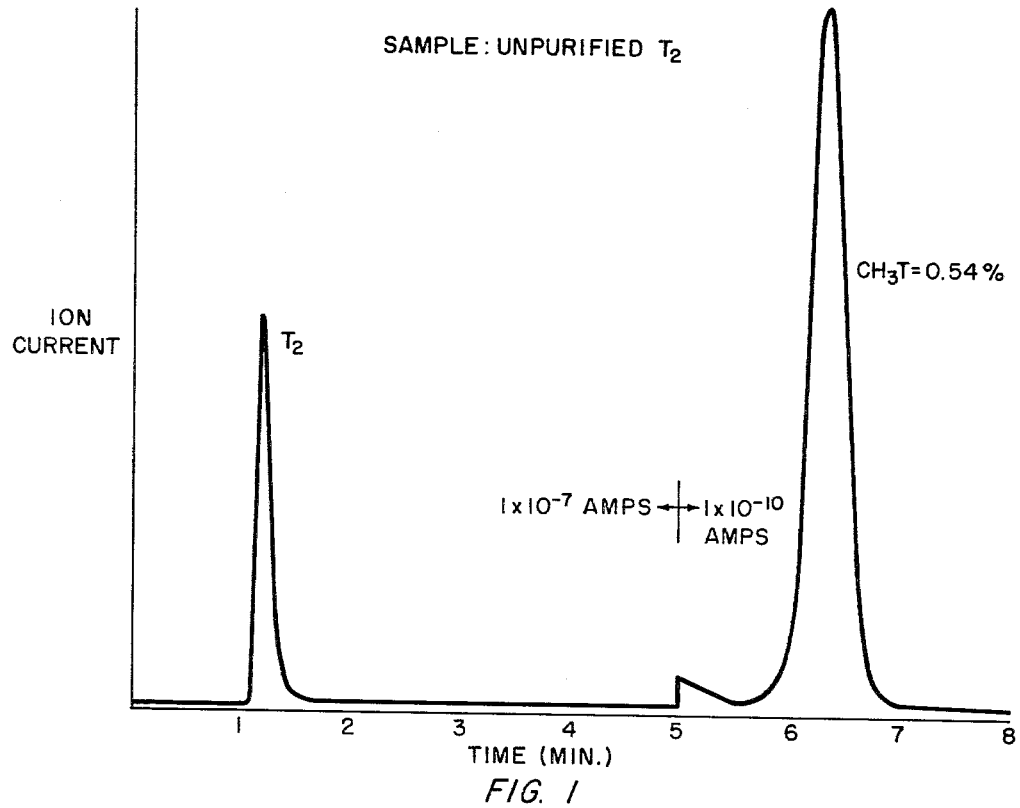
FIGURE 1 is a chromatogram showing ion current values for tritium and tritiated methane in an unpurified sample of tritium.

The effect of temperature upon the efficiency with which one gaseous component may be separated from another by preferential adsorption upon a molecular sieve material may be better understood by considering an idealized system in which there exists an equilibrium between adsorption and desorption of all components of the gaseous system. Without losing any generality, it may be assumed that the system is composed of three components—the adsorbent molecular sieve material and two gases, A and B. If an adsorbent material is selected such that one of the gaseous components, A, is more strongly adsorbed than gaseous component B, the separation factor, $\beta$, may be defined as:

(1) $$\beta = \left[\frac{C_{AS}}{C_{BS}}\right]\left[\frac{C_{BG}}{C_{AG}}\right]$$

In the equation, $C_{AS}$ and $C_{AG}$ denote the concentration of component A on the adsorbent and in the gas phase, respectively. $C_{BS}$ and $C_{BG}$ are similarly defined.

The most efficient separation is, of course, obtained if the adsorbent molecular sieve material retains almost all of the component A (more strongly adsorbed) and the gaseous phase contains practically pure component B (less strongly adsorbed). Therefore, the larger $\beta$ is indicative of more efficient separation. From the equilibrium assumption:

(2) $$\frac{C_{AG}}{C_{AS}} = e^{-\Delta H_1/RT}$$

(3) $$\frac{C_{BG}}{C_{BS}} = e^{-\Delta H_2/RT}$$

where $\Delta H_1$ and $\Delta H_2$ represent the heat of desorption of component A and B, respectively. By using (2) and (3) in (1) we obtain:

(4) $$\beta = e^{\delta(\Delta H)/RT}$$

where, (5) $$\delta(\Delta H) = \Delta H_1 - \Delta H_2$$

and other symbols have their usual meanings. Since the component A is adsorbed more strongly than component B, (6) $\qquad \delta(\Delta H) > 0$ Differentiation of (4) with respect to temperature gives:

(7) $\qquad \dfrac{d\beta}{dT} = \dfrac{-\delta(\Delta H)}{RT^2} e^{+\delta(\Delta H)/RT}$ The Equation (7) clearly shows that the efficiency of separation as indicated by the magnitude of $\beta$ sharply increases with decreasing temperature. The equation further suggests that certain gaseous mixtures which might not otherwise be separable into their several components by contact with molecular sieve material at room temperatures and higher might be separable at substantially lower temperatures. We have found this to be the case, and the following examples are illustrative of the low temperature selective adsorption process as it is applied to two types of gaseous mixtures which have previously been considered inseparable by molecular sieve adsorption techniques.

EXAMPLE 1

*Separation of tritiated methane from tritium*

A flat spiral column having three turns was prepared from Pyrex tubing. The column was 46 centimeters long with an inside diameter of 0.6 centimeter. The column was packed with ten grams of Linde 3A molecular sieve, 30 to 60 mesh, manufactured by the Linde Air Products Company. After degassing the column and sieve material for twelve hours at 300° C., the column was immersed in a bath of liquid methane. A Toepler pump was utilized to pass four curies of tritium gas contaminated with tritiated methane through the column over a period of about forty minutes and the purified tritium gas eluted from the column was collected in a Pyrex bulb.

Figure 2:
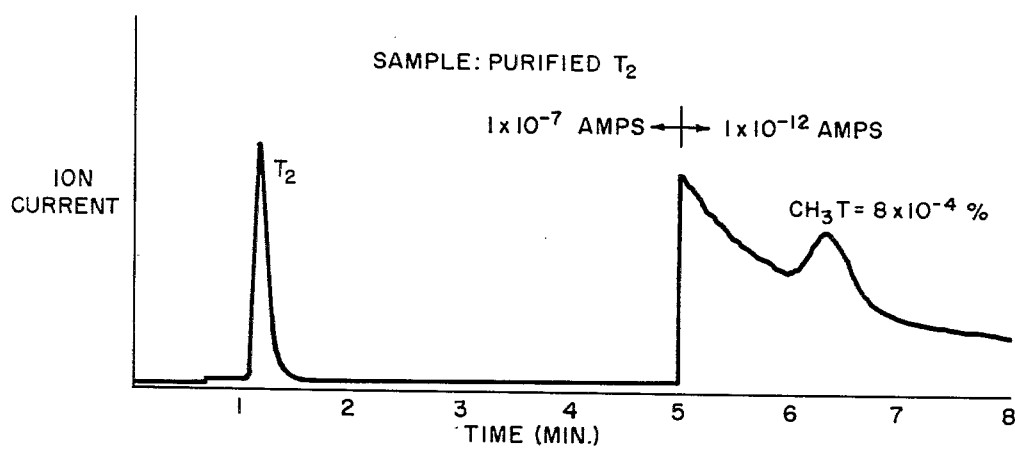
FIGURE 2 is a chromatogram showing ion current values for tritium and tritiated methane in a sample of tritium gas which has been purified by the process of the present invention.

In FIGURES 1 and 2, chromatograms of the tritium contaminated with tritiated methane and of the purified tritium, respectively, are illustrated. A comparison of the tritiated methane peaks in the two chromatograms shows that the described procedure resulted in the removal of substantially all of the tritiated methane. As illustrated in FIGURES 1 and 2, the ion current sensitivity of the detector was shifted after each of the major peaks (tritium) were recorded so that the tritiated methane peaks were amplified to facilitate more accurate evaluation.

Instrumental conditions employed in obtaining the chromatograms were:

Column: Linde 5A molecular sieve, 30–60 mesh, 5 meters long, 56° C.

Carrier gas: Helium, flow rate 75 cc./min.

Detector: A 10 cc. ionization chamber connected to a vibrating reed electrometer.

EXAMPLE 2

*Separation of ethane from methane*

Figure 3:
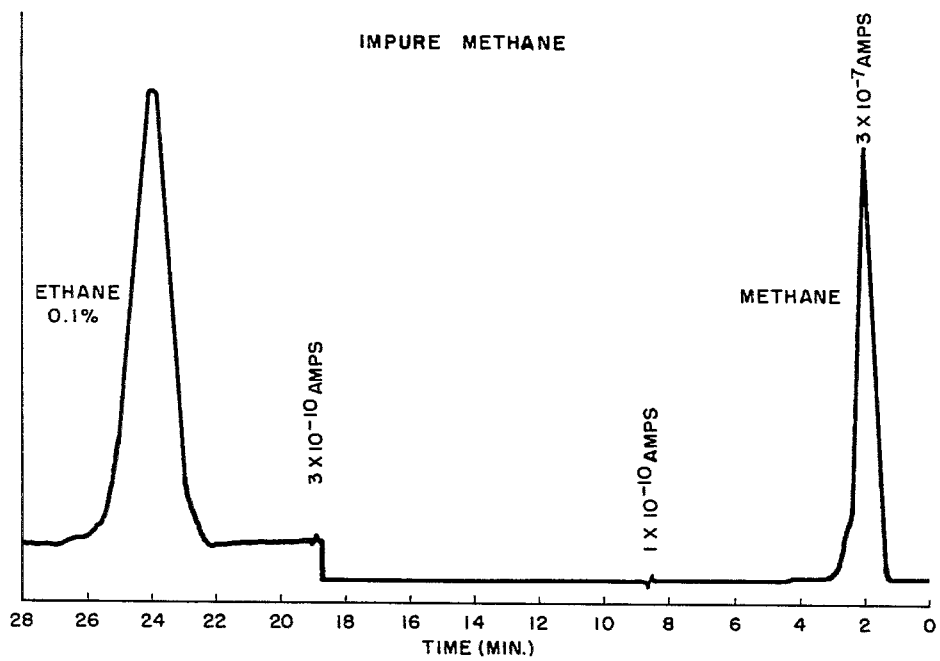
FIGURE 3 is a chromatogram showing ion current values for methane and ethane in an unpurified control sample of methane gas.
Figure 4:
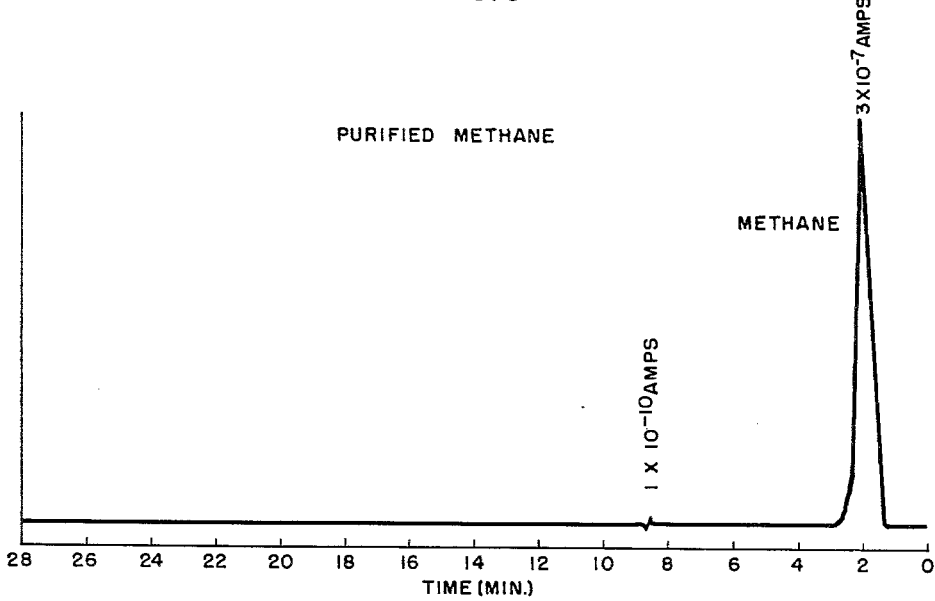
FIGURE 4 is a chromatogram showing ion current peaks for methane and ethane in a sample of methane gas which has been subjected to the process of the present invention.

Pyrex tubing 240 centimeters in length and having an inside diameter of 1 centimeter was wound in a spiral column with eleven turns. The column was packed with Linde 5A molecular sieve (manufactured by Linde Air Products Company) and evacuated at 300° C. for twenty-four hours to degas. The packed column was then immersed in a Dry Ice-acetone bath (temperature −75° C. to −80° C.) and about thirty grams of methane containing predominantly ethane as an impurity was passed through the column. The purified methane eluted from the column was compared with a control sample of vapor fractometer-flame ionization detector analysis. It was found that the control sample contained about 0.3 mole percent hydrocarbon impurity, most of which, as has been indicated, was ethane. No impurity could be detected in the purified sample. These results are graphically illustrated in the chromatograms of FIGURES 3 and 4.

Under the analytical conditions employed, as low as $10^{-4}$ mole percent of hydrocarbons (if present) should have been detected. Thus, it was concluded that hydrocarbon impurities in the purified methane were less than $10^{-4}$ mole percent.

We have found that instead of immersing the column in the Dry Ice-acetone bath, a temperature sufficiently low to effect separation may be obtained when liquid natural gas (methane containing hydrocarbon impurities) is placed adjacent the inlet to the column and allowed to evaporate through the column before appreciable warming up occurs. The ethane and other hydrocarbons which are absorbed upon the sieve material can readily be recovered for various uses.

It will be noted in the foregoing examples that in each of the separations, the temperature of the column and the molecular sieve material therein was maintained at a temperature relatively close to the boiling point of the absorbed component of the mixture. Thus, in the tritum-tritiated methane separation, the column was maintained at the temperature of liquid methane, which, allowing for the presence of impurities in the methane (such as occur when liquefied natural gas is utilized) may be said to fall within the range of about −135° C. to −165° C. In the ethane-methane separation, the column was maintained at a temperature of from about −75° C. to −80° C., the normal temperature range of an acetone-Dry Ice bath. The ethane which is preferentially adsorbed upon the sieve has a boiling point of −88.6° C.

It may be postulated that the efficiency of the separation under these circumstances is lagrely attributable to the substantial decrease in the speed of molecular vibration of the adsorbed components at temperatures close to their boiling points without a corresponding decrease in molecular vibrational energy in the component which is less strongly adsorbed and which has a substantially lower boiling point than the adsorbed component. It is then much easier for the less active molecules to be lodged in, and retained by, the pores of the sieve material than is the case of the more active molecules of the lower boiling material. This explanation for the observed preferential adsorption at temperature close to the boiling point of the adsorbed component conforms to the relationship between the separation factor $\beta$ and temperature which has been developed and discussed above.

From the foregoing description it will be apparent that the present invention provides a technique for quickly separating gases of low molecular weight and relatively small molecular size. The merit of the process resides in its simplicity and efficiency in purifying certain gaseous materials. Both extremely pure tritium gas and pure methane are obtainable by the process, and the impurities retained on the sieve material by selective adsorption can be readily recovered by procedures well understood in the art.

As will be apparent to those skilled in the art upon reading the foregoing disclosure, many modifications, substitutions and changes are possible in practicing the process of the present invention, and insofar as such departures from the disclosure come within the scope of the appended claims, they are deemed to be within the spirit and scope of the present invention.

We claim:

1. A method of purifying tritium gas by removing tritiated methane present as an impurity which comprises packing a spiral, Pyrex tubular column 46 centimeters long and 0.6 centimeter inside diameter with ten grams of a molecular sieve material having a pore size of about 3 Angstrom units; degassing the column and sieve material; immersing the column in liquid methane; and passing the impure tritium through said column to preferentially adsorb tritiated methane.

2. The method of purifying methane by removing ethane therefrom which comprises contacting the impure mixture while in the gaseous phase with a molecular sieve material having a pore diameter of about 5 Angstrom units and maintained at a temperature of between −75° C. and −85° C.; and preferentially adsorbing ethane on said molecular sieve material.

3. A method of recovering ethane from natural gas which comprises passing natural gas containing ethane through a fixed bed of molecular sieve material having a pore diameter of about 5 Angstrom units and maintained at a temperature of between −75° C. and −85° C. to preferentially adsorb ethane upon said molecular sieve material; removing said natural gas from contact with said molecular sieve material; and then desorbing the ethane from said molecular sieve material.

4. A method of purifying methane by removing ethane therefrom which comprises packing a spirally wound, tubular Pyrex column 1 centimeter in diameter and 240 centimeters long with a molecular sieve material having a pore diameter of 5 Angstrom units; degassing the column and sieve material; immersing the column in Dry Ice-acetone bath; and passing the methane-ethane mixture in a gaseous state through said column to preferentially adsorb ethane on said molecular sieve material.

5. A method of purifying natural gas by removing ethane and higher paraffin hydrocarbon homologues therefrom which comprises placing liquefied natural gas to be purified adjacent the inlet to a column packed with a molecular sieve material having a pore diameter of about 5 Angstrom units; and evaporating said natural gas through said column to preferentially adsorb ethane and higher paraffin hydrocarbon homologues on said molecular sieve material.

6. A method of separating trituim from tritiated methane which comprises contacting a mixture of tritium and tritiated methane while in the gaseous phase with a molecular sieve material to preferentially adsorb tritiated methane, said molecular sieve material having a pore diameter of about 3 Angstrom units and wherein said molecular sieve material is maintained at a temperature of between approximately −135° C. and −165° C. during said contact.

References Cited by the Examiner

UNITED STATES PATENTS

| | | |
|---|---|---|
| 2,882,243 | 4/59 | Milton. |
| 2,893,512 | 7/59 | Armond _____ 55—75 X |
| 2,963,519 | 12/60 | Kasperik et al. _____ 55—75 X |
| 2,971,607 | 2/61 | Caswell _____ 55—75 X |

FOREIGN PATENTS 555,482   4/58   Canada.

OTHER REFERENCES

"Molecular Sieves," by D. W. Breck et al., Scientific Americal, January 1959, pages 85–96.

REUBEN FRIEDMAN, *Primary Examiner.*

HARRY B. THORNTON, HERBERT L, MARTIN, EUGENE F. BLANCHARD, *Examiners.*

UNITED STATES PATENT OFFICE
CERTIFICATE OF CORRECTION

Patent No. 3,208,200                  September 28, 1965

Preston L. Gant et al.

It is hereby certified that error appears in the above numbered patent requiring correction and that the said Letters Patent should read as corrected below.

Column 3, line 69, for "of" read -- by --; column 4, lines 13 and 19, for "absorbed", each occurrence, read -- adsorbed --; line 31, for "lagrely" read -- largely --; line 42, for "temperature" read -- temperatures --; column 6, line 3, for "trituim" read -- tritium --.

Signed and sealed this 16th day of August 1966.

(SEAL)
Attest:

ERNEST W. SWIDER                            EDWARD J. BRENNER
Attesting Officer                              Commissioner of Patents